F. W. JOHNSON.
SHORE DREDGE.
APPLICATION FILED AUG. 30, 1911.
1,058,064.
Patented Apr. 8, 1913.
6 SHEETS—SHEET 1.
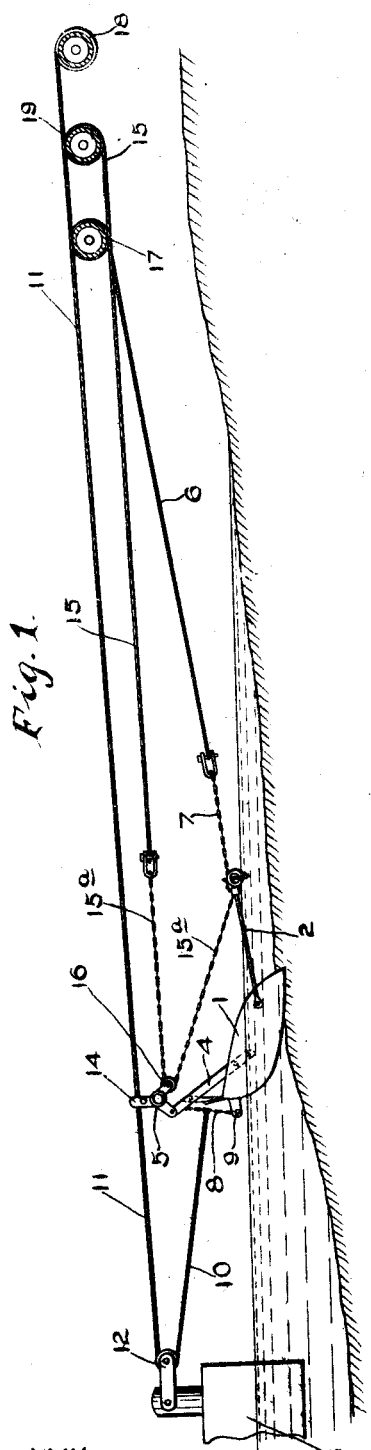
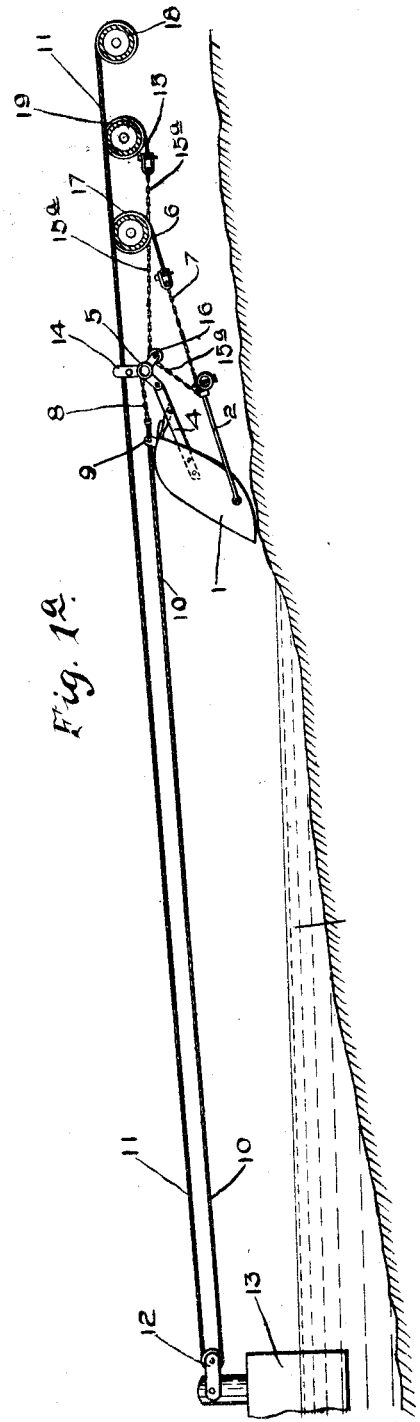
Witnesses:
H. A. Hillgren
Geo. Knutson
Inventor:
Frederick W. Johnson
By his Attorneys
Williamson Merchant

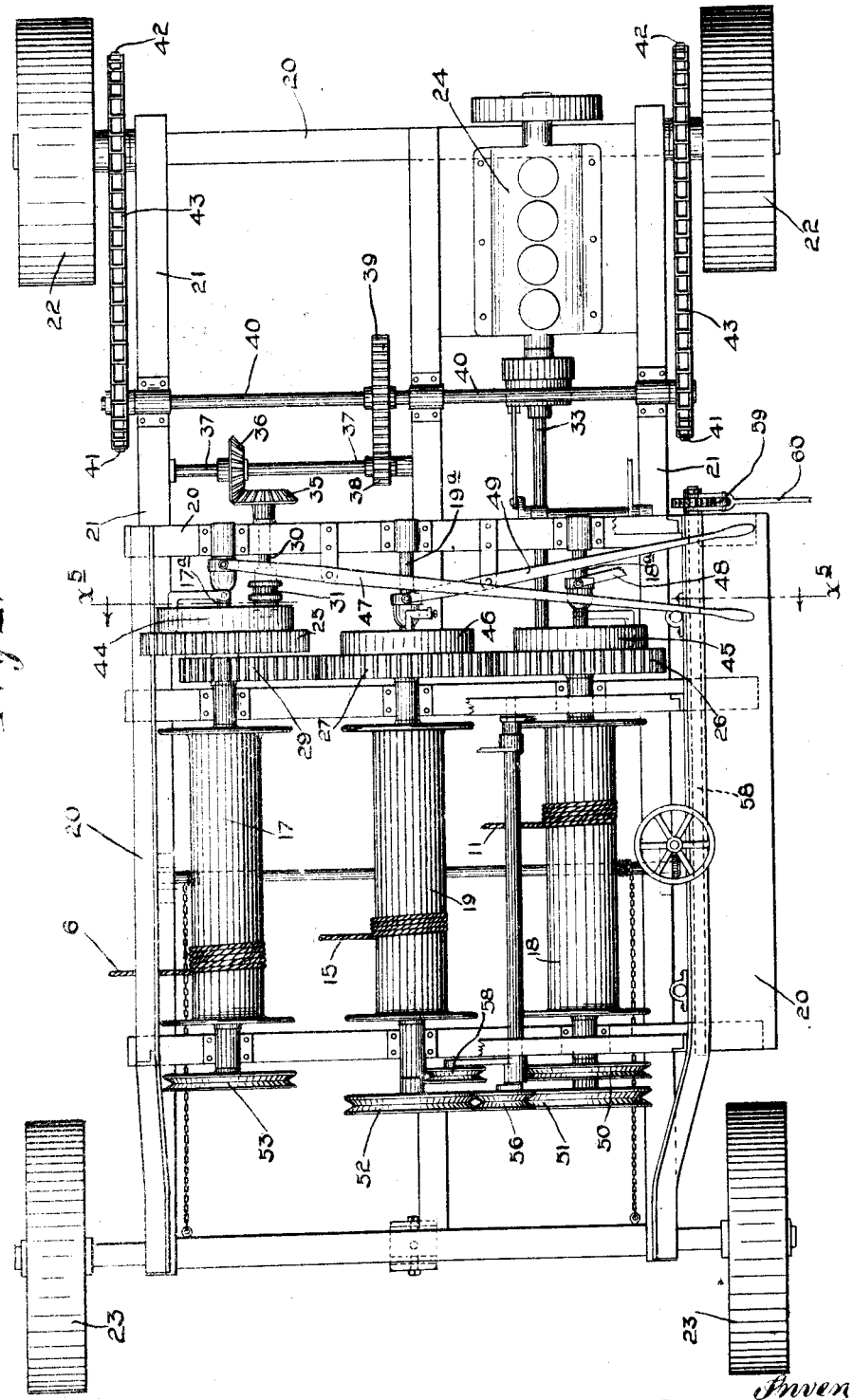

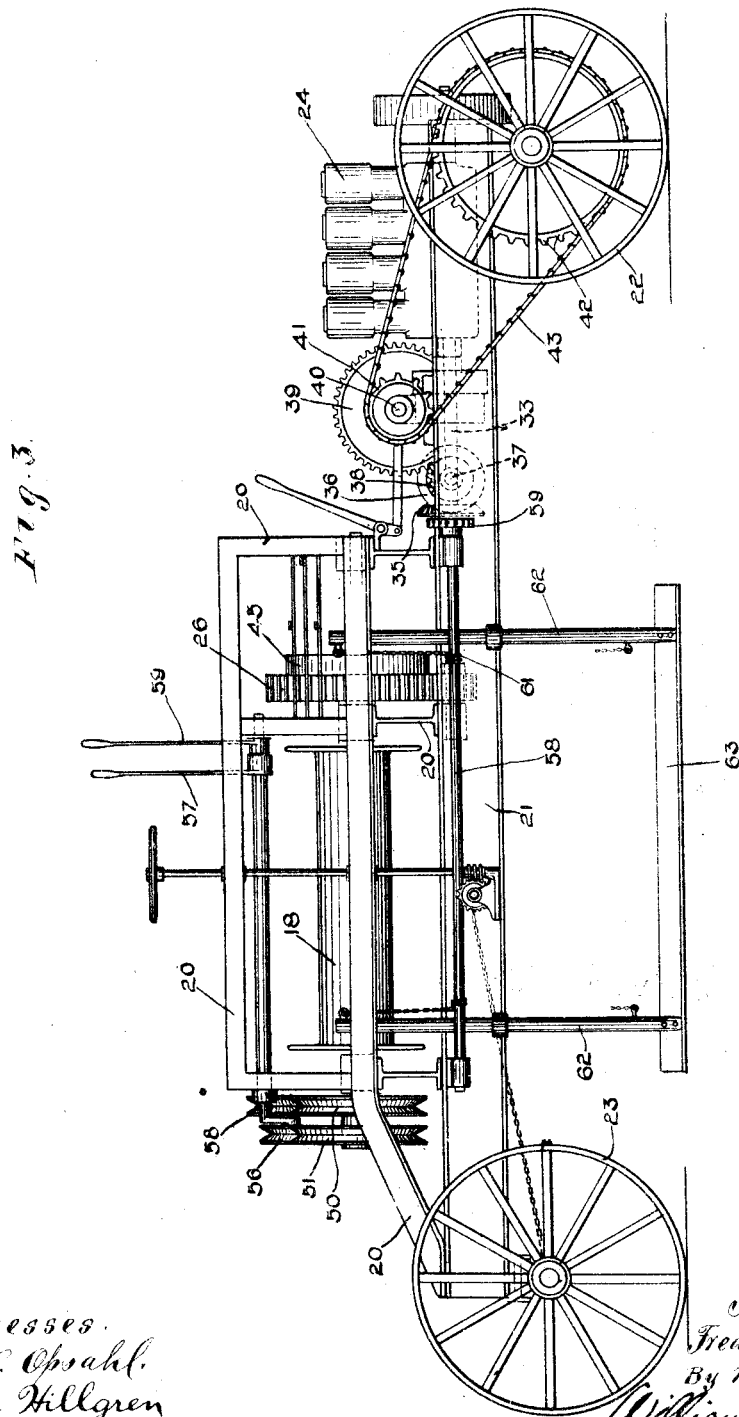

F. W. JOHNSON.
SHORE DREDGE.
APPLICATION FILED AUG. 30, 1911.
1,058,064.
Patented Apr. 8, 1913.
6 SHEETS—SHEET 4.
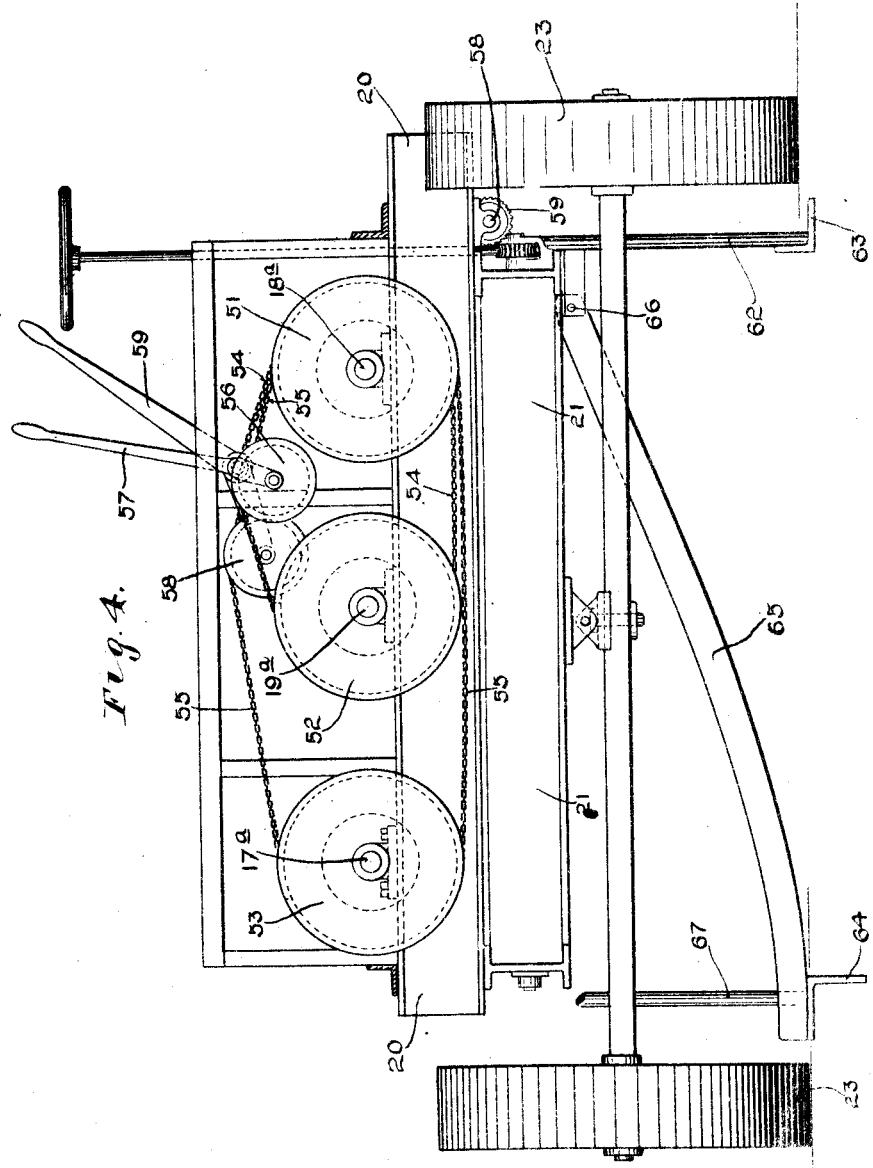

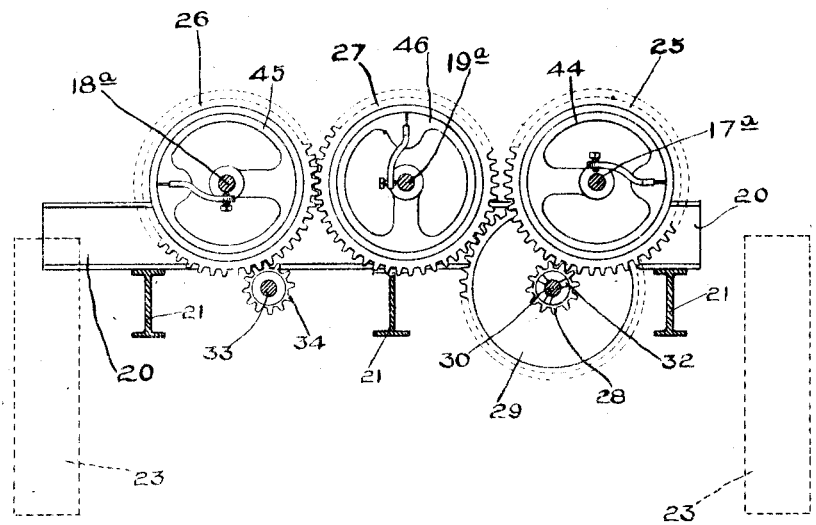

F. W. JOHNSON.
SHORE DREDGE.
APPLICATION FILED AUG. 30, 1911.
1,058,064.
Patented Apr. 8, 1913.
6 SHEETS—SHEET 6.
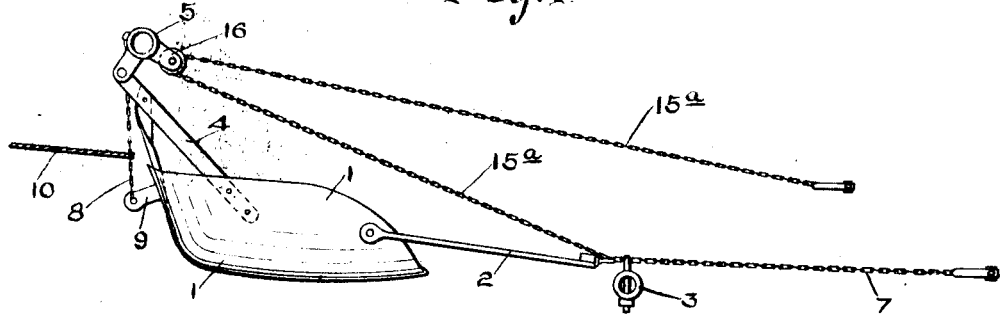
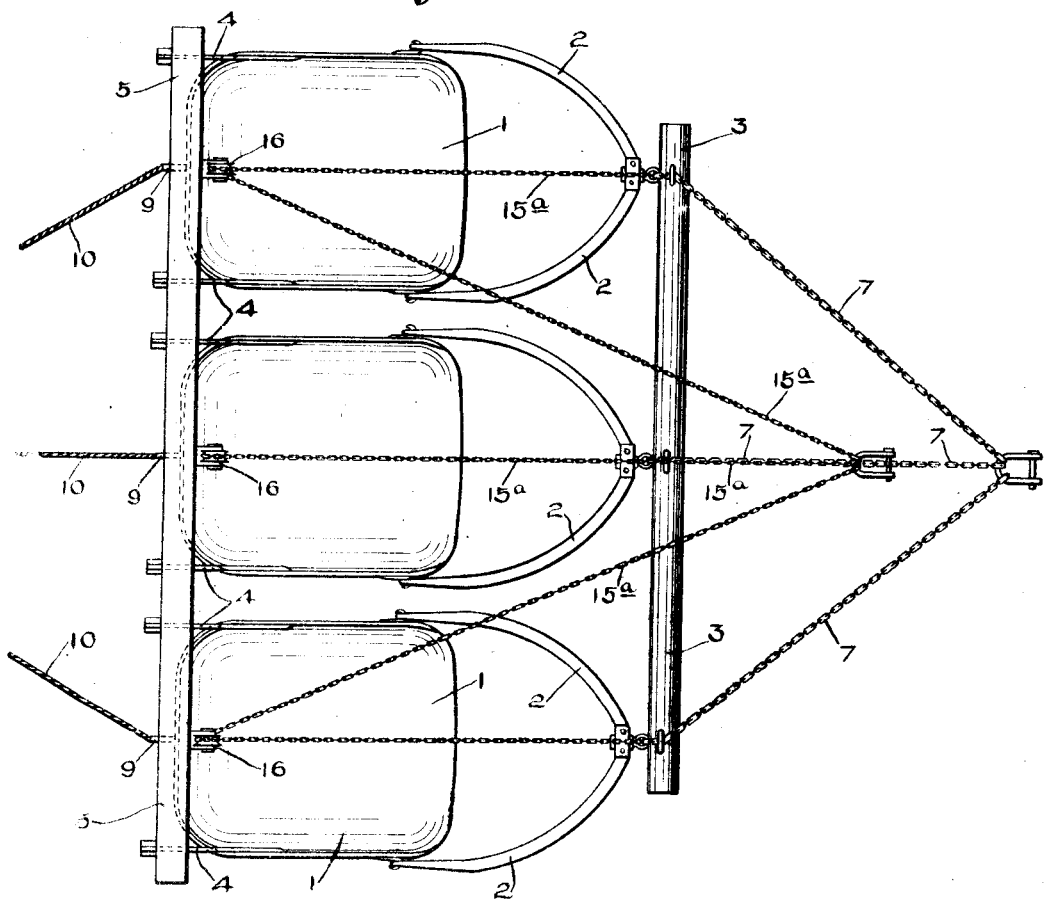
Witnesses:
H. A. Hillgren,
Geo. Knutson
Inventor;
Frederick W. Johnson
By his Attorneys;
William M. Merchant

UNITED STATES PATENT OFFICE.

FREDERICK W. JOHNSON, OF EXCELSIOR, MINNESOTA.

SHORE-DREDGE.

1,058,064.

Specification of Letters Patent.

Patented Apr. 8, 1913.

Application filed August 30, 1911. Serial No. 646,812.

*To all whom it may concern:*

Be it known that I, FREDERICK W. JOHNSON, a citizen of the United States, residing at Excelsior, in the county of Hennepin and State of Minnesota, have invented certain new and useful Improvements in Shore-Dredges; and I do hereby declare the following to be a full, clear, and exact description of the invention, such as will enable others skilled in the art to which it appertains to make and use the same.

My invention has for its object to provide a highly efficient shore dredge especially adapted for use in dredging the shores of lakes and rivers to clear the same of mud, weeds, and the like.

Generally stated, the invention consists of the novel devices and combinations of devices hereinafter described and defined in the claims.

The invention is illustrated in the accompanying drawings, wherein like characters indicate like parts throughout the several views Referring to the drawings, Figure 1 is a diagrammatic view illustrating the action of the dredging apparatus; Fig. 1ª is a diagrammatic view similar to Fig. 1, but showing the scrapers in dumping position; Fig. 2 is a plan view of the dredge operating machine; Fig. 3 is a side elevation of the parts shown in Fig. 2; Fig. 4 is a front elevation of the machine shown in Fig. 2 and Fig. 3, some parts being sectioned; Fig. 5 is a detail view taken in section, approximately on the line $x^5 x^5$ of Fig. 2, some parts being removed and some parts being indicated by dotted lines only; Fig. 6 is a plan view showing a gang of scrapers; and Fig. 7 is a side elevation of the parts shown in Fig. 6.

In accordance with my invention, I employ a three-cable system for moving the scraper or gang of scrapers. One of these cables is used to draw the bucket forward, another is used to draw the bucket rearward or back to a position for filling, and a third is used to give the bucket or scraper the proper inclination for filling, and to tip the same when it has been drawn to the proper point for the deposit of the load. The cable actuating drums and coöperating driving mechanism are preferably mounted on the frame of a traction engine, so that they may be readily moved from place to place. A suitable anchorage, such as a barge, with anchoring spuds, may be used as a base of reaction for returning the scrapers to the filling or starting point, and the traction engine is preferably provided with a suitable anchoring spud for anchoring the engine so that it will afford a proper base of reaction for pulling the load of scrapers or buckets.

In the drawings, the scrapers or buckets 1 are provided with the usual drag bails 2, connected to an evener beam 3. At their rear portions, the said scrapers are provided with brackets 4 that are pivotally connected to a spacing beam 5. The so-called drag beam 3 and so called spacing beam 5 are preferably made from wrought or steel pipe. The several scrapers of the gang are thus connected for independent pivotal movements. The scraper bails 2 are connected to a draw cable 6 by chains or cables 7. It may be here stated, that the term cable and chain are herein used as synonymous terms and intended to broadly cover any suitable form of flexible draft connection. The rear ends of the chains 7 are preferably directly attached to the equalizing beams 3. Short chains 8 connect the tie beams 5 to lugs 9 on the buckets or scrapers 1, and the intermediate portions of these chains 8 are connected by chains 10 to a back draw cable 11. This back draw cable 11 runs over a guide sheave 12, which is journaled to a suitable anchor, usually in the form of a barge 13, as already stated. This back draw cable 11 is brought forward toward the shore and passed through a suitable guide 14 on the central portion of the tie beams 5. The third cable 15 is provided with branches 15ª that are passed over guide sheaves 16 on the tie beams 5, and are brought downward and forward and attached to the respective bails 2, or, if desired, to the equalizing beams 3 near the points of attachment of the bails thereto. The cables 6, 11 and 15, at their shore ends, are attached, respectively, to windlass drums 17, 18 and 19. These windlass drums 19 are journaled in suitable bearings on a supplemental frame 20, that is rigidly secured to the framework 21 of the traction engine. Of the other parts of the traction engine, it is only necessary, for the purposes of this case to note, the traction wheels 22, the steering wheels 23, the engine 24, and the engine driving connections, which latter will be hereinafter noted.

The numerals 25, 26 and 27 indicate large spur gears which, respectively, are loosely journaled on the shafts 17ᵃ, 18ᵃ and 19ᵃ of the drums 17, 18 and 19. The gears 26 and 27 are in mesh with each other. The gear 25 is in mesh with a spur pinion 28, cast integral with a spur gear 29, and both being loosely journaled on a short shaft 30, which, in turn, is journaled in suitable bearings on a supplemental frame 20. The shaft 30 is adapted to be connected, at will, for rotation with the pinion 28 and gear 29, by means of an ordinary sliding half clutch 31 keyed for sliding movement on said shaft and engageable with a half clutch 32 on the said pinion (see Figs. 2 and 5). The gear 29 meshes with the gear 27.

The numeral 33 indicates a driving shaft that is alined with the engine crank shaft and is adapted to be coupled thereto, at will, by an ordinary reversing gear. This shaft 33 carries a pinion 34, that meshes with the gear 26, so that the train of gears 25, 26, 27, 28 and 29 may be continuously driven when the engine is in action. At its rear end, the shaft 30 carries a bevel gear 35 that meshes with a bevel gear 36 on a short counter shaft 37, journaled in suitable bearings on the machine frame 21. The shaft 37 carries a spur pinion 38, that meshes with a spur gear 39, carried by a transverse counter shaft 40, journaled in suitable bearings on the said frame 21. At its ends, the shaft 40 carries sprockets 41, over which and the larger sprockets 42, on the hubs of the traction wheels 22, sprocket chains 43 are arranged to run.

The spur gears 25, 26 and 27 are adapted to be connected to the coöperating drum shafts 17ᵃ, 18ᵃ, and 19ᵃ, respectively, by friction clutches 44, 45, and 46. The said clutches 44, 45, and 46 may be of any suitable well known construction and are adapted to be operated in the well known way, by means of levers 47, 48 and 49. But these clutches and levers, and drums 17, 18 and 19, may be thrown into action either simultaneously, or severally, at will. Hence, by manipulation of these windlass drums, the three operating cables 6, 11 and 15 may be wound up and let out, at will.

As already indicated, the scrapers or buckets are drawn forward, filled and delivered to the point where the excavated material is to be deposited, by winding up the draw cable 6 and by applying such pull on the tripping cable 15 as may be required, in the first instance, to give the bucket the proper dip for filling, and, in the second instance, to dip the filled bucket at the point where the material is to be deposited. Also, as stated, the buckets are returned to the point for filling by drawing on the back draw cable 11. It is important to note that in the dumping action, when the dip cable 15 is wound up, it not only rocks the backs of the buckets upward and forward, but lifts up the bails 2 and equalizing beams 3 so that the dumped load will be deposited, and so that the bails and beams will not drag the deposited earth backward when the scrapers are returned.

At its front end, the drum shaft 18ᵃ is provided with two grooved wheels 50 and 51. At its rear end, the drum shaft 19ᵃ is provided with a grooved wheel 52 that is alined with the wheel 51, and, at its front end, the drum shaft 17ᵃ is provided with a grooved wheel 53 that is alined with the wheel 50. An endless chain 54 is run over the alined wheels 51 and 52, and an endless chain 55 is run over the alined wheels 50 and 53. The upper portion of the chain 54 is also passed over a grooved tightening wheel 56 carried by the lower end of a lever 57, pivoted to the suitable supports on the supplemental frame 20. In a similar manner, the upper portion of the chain 55 runs over a grooved tightening wheel 58, carried by the lower end of an operating lever 59 that is also pivoted to a suitable support on the frame 21.

When the scrapers are drawn forward with the load, the drum 17 is thrown into action by closing of the clutch 44 while the clutches 45 and 46 are open. The drawin drum 17, when driven through its clutch, is driven much slower than is the tripping drum 19 when driven through its clutch, and it is usually desirable that when drawing in a load, both of the cables 5 and 15 be drawn forward at the same speed, so as to maintain the fixed inclination or position of the scrapers at about the same speed. This is accomplished without throwing the clutch 46 into action, simply by tightening the chain 54, so that the drum shafts 18ᵃ and 19ᵃ will be frictionally driven at the same speed. If, at any time, when drawing the load forward, a change in the inclination of the scrapers is desired, this may be accomplished, in the first instance, by allowing slippage between the chain 54 and wheels 51 and 52, so as to increase the inclination of the scrapers, or the inclination of the scrapers may be decreased by closing the clutch 46 for an instant. The drawback, or return drum 18, is also driven at a much higher speed than the drawin drum 17, and the said latter drum, and the tripping drum 19 must unwind as fast as the said drum 18 winds up in returning the scrapers. If the scrapers should strike a snag, and thereby be brought to a quick stop, momentum would tend to cause the drums 17 and 19 to continue rotation and snarl up the cable. This is effectually prevented by the putting tension on both of the chains 54 and 55, which then afford a friction drive, causing the said drums 17 and 19 to rotate at the same speed as the said drum 18, and to come to a stop with the latter.

For anchoring the traction engine while operating the windlass drums and cables, I provide spuds or anchoring frames which may be, and preferably are constructed as shown in the drawings. Referring to Figs. 2, 3 and 4, the numeral 58 indicates a windlass shaft mounted in suitable bearings on one side of the frame 21 and provided at one end with a ratchet wheel 59 that is subject to a hand operated ratchet lever 60. The windlass shaft 58 has intermediately wound chains 61, the ends of which are attached to vertically movable posts 62, the lower ends of which are rigidly tied together by a ground engaging anchor bar 63 in the form of an angle bar. At the other side of the machine is a similar ground engaging anchor bar 64, that is attached to the free ends of a pair of arms 65 pivoted at 66 to suitable bearings on the frame 21. The anchor bar 64 may be raised and lowered by a device constructed on the same plan as the device used to vertically adjust the anchor bar 63. Of the parts of this latter adjusting device, only the vertically movable posts 67 are shown.

As is evident, when the anchor bars 63 and 64 of the two anchoring spuds are forced into contact with the ground, the traction engine will be securely anchored against lateral movements and thus adapted to withstand the heavy lateral strains produced in drawing the loaded scrapers; and furthermore, the frame of the tractor will be held against vibration under action of the engine.

What I claim is:

1. In an apparatus of the kind described, the combination with a scraper having a pivoted bail, of three independent operating cables, one connected to said bail for drawing the scraper forward, one connected to the rear of the scraper for returning the same rearward, and the other thereof, connected to said bail, passed rearward over a suitable guide and then directly forward therefrom, said guide being located at the rear of said bail and carried with said scraper, and means for independently operating said cables.

2. In an apparatus of the kind described, the combination with a scraper, having a pivoted bail, of three independent cables and means for guiding and independently operating the same, one of said cables being attached to said scraper bail and extended directly forward therefrom, a second cable being attached to said scraper bail and passed rearward over a suitable guide and then directly forward therefrom, said guide being located at the rear of said bail and carried with said scraper, and a third cable being attached to the rear portion of said scraper and extended over a suitable anchorage.

3. In an apparatus of the kind described, the combination with a scraper, having a pivoted bail, of three independent cables and means for guiding and independently operating the same, one of said cables being attached to said scraper bail and extended directly forward therefrom, a second cable being attached to said scraper bail and passed rearward over a suitable guide and then directly forward therefrom, said guide being located at the rear of said bail and carried with said scraper, and a third cable being attached to the rear portion of said scraper and extended over a suitable anchorage, and then extended directly forward from said anchorage through a guide carried by said scraper.

4. In an apparatus of the kind described, the combination with a scraper having a pivoted bail, of three independent cables and means for guiding and independently operating the same, one of said cables being attached to said scraper bail and extended directly forward thereof, a second cable being attached to said scraper bail and passed rearward over a suitable guide and then directly forward therefrom, said guide being located at the rear of said bail and carried with said scraper, and a third cable being attached to the rear portion of said scraper and extended over a suitable anchorage substantially as described.

5. In an apparatus of the kind described, the combination with front and rear beams, of a plurality of scrapers having their rear body portions attached to said rear beam, and provided with pivoted bails attached to the said front beam, cable guides on the rear beam, a distant anchorage, three driven drums having independent controlling means, and three operating cables, operated one by each of said drums, one of said cables being attached to the said front beam, a second cable being passed over the cable guides on said rear beam and connected to said front beam, and the third cable being passed over said anchorage and connected to the rear portions of said scrapers, substantially as described.

6. In an apparatus of the kind described, the combination with an engine and a distant anchorage, of three drums, means for independently driving said drums from said engine, a scraper having a forwardly extended pivoted bail, and a cable guide located over its rear portion, and three operating cables driven, one from each of said drums, one of said cables being connected to and extended directly forward from said scraper bail, a second cable being passed over said cable guide and attached to said scraper bail, and the third cable being passed over a guide on said distant anchorage and connected to the rear portion of the body of said scraper, substantially as described.

7. In an apparatus of the kind described, the combination with a traction engine having three drums and means for independently driving said drums, of a distant anchorage, a gang of scrapers having pivoted bails, a rear beam connected to the rear portions of the bodies of said scrapers and provided with cable guides, a front beam connected to the bails of said scrapers, and three operating cables, operated one by each of said drums, one of the said cables having branches attached to said front beam, another of said cables having branches passed over the cable guides on said rear beam and brought forward and connected to said front beam, and a third cable being passed over a guide on said anchorage and having branches attached to the rear portions of the bodies of said scrapers and to the said rear beam, substantially as described.

8. In an apparatus of the kind described, the combination with three operating drums and means for independently driving the same, of a distant anchorage, a scraper, three cables operated one by each of said drums, all connected to said scraper, one serving to draw the same forward, a second to trip the same, and a third serving to draw the scraper backward and passed over a guide on said anchorage, and frictional driving connections between the said several drums, substantially as described.

9. In an apparatus of the kind described, the combination with front and rear beams, of a plurality of scrapers having their rear body portions pivotally attached to said rear beam, and provided with pivoted bails attached to the said front beam, cable guides on the rear beam, a distant anchorage, three driven drums having independent controlling means, and three operating cables, operated one by each of said drums, one of said cables being attached to the said front beam, a second cable being passed over the cable guides on said rear beam and connected to said front beam, and the third cable being passed over said anchorage and connected to the rear portions of said scrapers, substantially as described.

In testimony whereof I affix my signature in presence of two witnesses.

FREDERICK W. JOHNSON.

Witnesses:
MILDRED L. NUMMA,
HARRY D. KILGORE.